United States Patent [19]
Hubbell, III

[11] 3,960,232
[45] June 1, 1976

[54] EXHAUST SYSTEM MOUNTING
[75] Inventor: Franklin R. Hubbell, III, Brookyln, Mich.
[73] Assignee: Tenneco Inc., Racine, Wis.
[22] Filed: Sept. 17, 1973
[21] Appl. No.: 398,540

Related U.S. Application Data
[63] Continuation-in-part of Ser. No. 211,585, Dec. 23, 1971, abandoned.

[52] U.S. Cl. .............................. 180/64 A; 248/542; 248/58; 248/74 A
[51] Int. Cl.² .......................................... B60K 13/04
[58] Field of Search ................. 180/64 A; 248/54 R, 248/58, 74 A, 278

[56] References Cited
UNITED STATES PATENTS

| | | | |
|---|---|---|---|
| 2,160,808 | 6/1939 | Bradley | 180/64 A |
| 2,267,431 | 12/1941 | Steensen | 180/64 A |
| 2,288,172 | 6/1942 | Vlrich | 180/64 A |
| 2,308,969 | 1/1943 | Riesing | 180/64 A |
| 2,744,706 | 5/1956 | Gerdy | 180/64 A |
| 3,161,252 | 12/1964 | Brown | 180/64 A |

FOREIGN PATENTS OR APPLICATIONS

| | | | |
|---|---|---|---|
| 946,773 | 8/1956 | Germany | 180/64 A |
| 10,055 | 3/1905 | United Kingdom | 248/74 A |

Primary Examiner—M. H. Wood, Jr.
Assistant Examiner—David M. Mitchell
Attorney, Agent, or Firm—Harness, Dickey & Pierce

[57] ABSTRACT

An exhaust system for an automobile, or motor vehicle generally, is supported by a series of hangers on the frame or chassis of the automobile, the hangers having an exhaust conduit mounting means in the form of resilient jaws that spread apart upon insertion of the conduit and then snap in place through their own inherent resiliency to hold the conduit in the desired suspended position.

7 Claims, 12 Drawing Figures

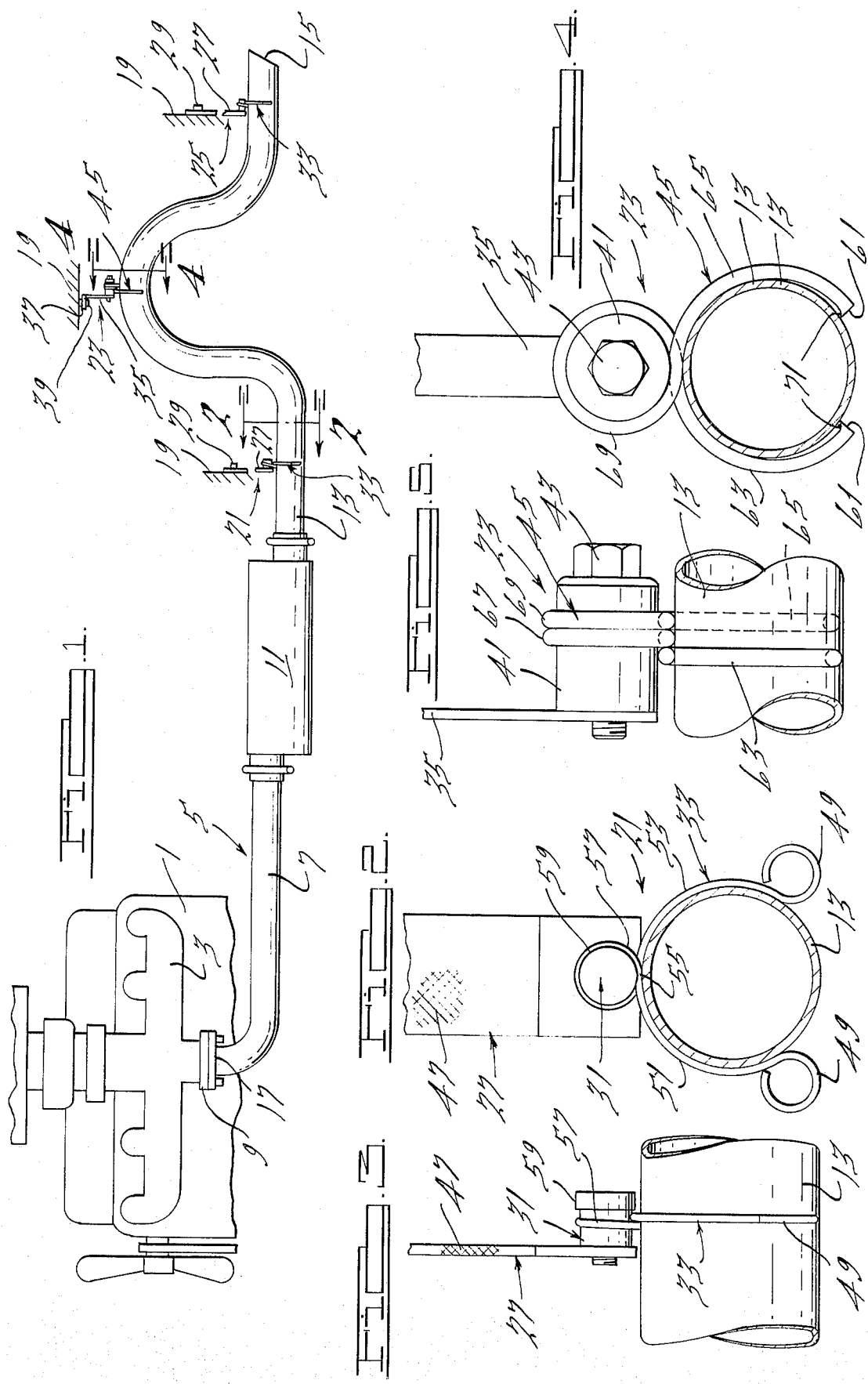

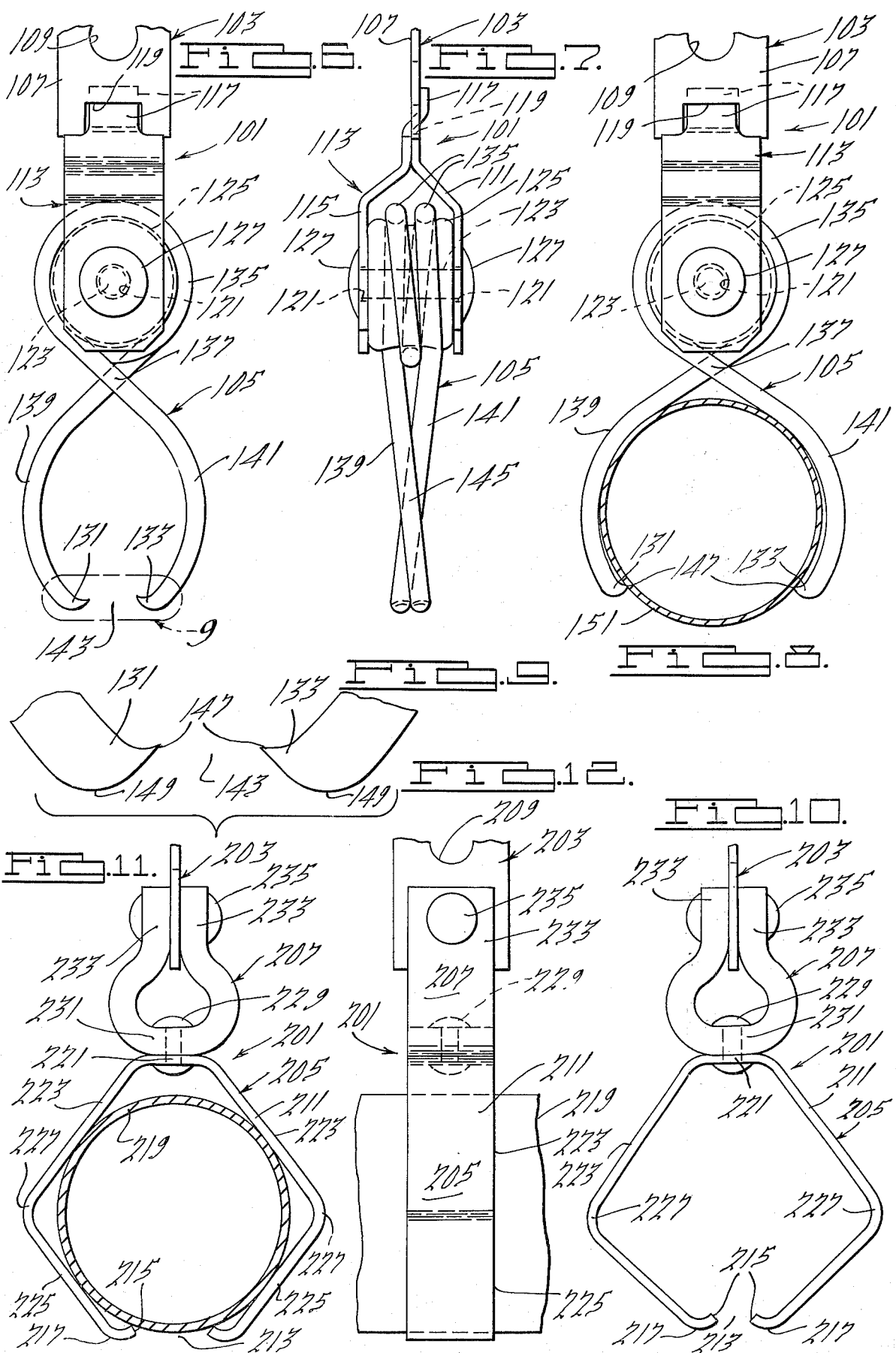

3,960,232

EXHAUST SYSTEM MOUNTING

RELATED APPLICATON

This application is a continuation-in-part of my co-pending U.S. application Ser. No. 211,585, filed Dec. 23, 1971 and now abandoned.

BACKGROUND OF THE INVENTION

It is a known practice in the suspension of automotive exhaust systems to support the exhaust pipe and/or tailpipe (exhaust conduits) at various points along the system length to fixed parts of the frame or chassis of the vehicle. Such support includes a pipe holding means which is normally a clamp that comprises a bracket and a U-shaped wire that extends around the pipe and is secured to the bracket. The assembly and diassembly of conduit, bracket, and wire is time consuming and the parts themselves are sometimes rather expensive.

BRIEF SUMMARY OF THE INVENTION

It is the primary purpose of this invention to provide an improved mounting or support system for the exhaust system of an internal combustion engine, particularly systems used in motor vehicles, especially automobiles, that provides quick and easy assembly and disassembly and which is relatively inexpensive to manufacture.

In a principal application the invention accomplishes this purpose by means of a series of pipe suppots that have resilient jaws which open under the pressure of insertion of an exhaust conduit and hen resiliently snap in place around the conduit when it is properly positioned within the jaws.

DESCRIPTION OF THE DRAWINGS

FIG. 1 is a schematic side elevation of an automotive internal combustion engine with an exhaust system that is suspended by means embodying the present invention;

FIG. 2 is an enlarged front elevation of one of the hangers used in the system of FIG. 1 as taken along the line 2—2 of FIG. 1;

FIG. 3 is a side elevation of the structure shown in FIG. 2;

FIG. 4 is a view similar to FIG. 2 but showing a modified form of hanger or mounting means;

FIG. 5 is a view similar to FIG. 3 of the modified form of hanger shown in FIG. 4;

FIG. 6 is a front elevation of a preferred form of hanger in which the perforated metal hanger strap is broken away;

FIG. 7 is a side elevation of the hanger of FIG. 6;

FIG. 8 is a front elevation of the hanger of FIG. 6 showing it expanded to hold a conduit in place, the conduit being in section;

FIG. 9 is an enlarged view of the structure within the line 9 of FIG. 6;

FIG. 10 is a front elevation of a modified form of hanger in which the perforated metal hanger strap is broken away;

FIG. 11 is a front elevation similar to FIG. 10 but showing the hanger holding a conduit, the conduit being in section; and FIG. 12 is a side elevation of the hanger of FIG. 11 with the conduit broken away.

DETAILED DESCRIPTION OF THE INVENTION

An automobile or other motor vehicle has an internal combustion engine 1 with an exhaust manifold 3 that discharges exhaust gases into an exhaust line or system 5 that may include an exhaust pipe 7 which is connected at its inlet end to the outlet 9 of the manifold 3. The exhaust pipe 7 conducts gases to an exhaust gas silencing muffler 11 which in turn discharges exhaust gases into a tailpipe 13 through which the gases flow until they reach the outlet 15 for discharge into the atmosphere. The front part of the exhaust line or system 5 is supported by means of the usual attachment pad 17 that is bolted to the manifold outlet flange to hold the inlet of the exhaust pipe 7 in position. Mounting or support means, however, are needed to support various points of the exhaust line 5 downstream from the monting pad 17 and this mounting means is preferably arranged to permit some vibration or relative movement of the exhaust line with respect to the chassis or frame 19 of the vehicle. In the exhaust system 5 of FIG. 1, three hanger or mounting means, 21, 23, and 25 are illustrated and are intended to typify any number of mounting means and any location of mounting means that may be determined to be necessary and possible to use in the suspension of an exhaust system of a given design on a given vehicle. The mounting means 21 and 25 are of one form of construction, shown in more detail in FIGS. 2 and 3, while the mounting means 23 is of a second form of construction that is shown in detail in FIGS. 4 and 5. This illustrates that the specific form of the mounting means of this invention in a given system may vary and it will also be understood that identical mounting means can be used throughout a given system, e.g., the mounting means 23 could be identical to the mounting means 21 and 25 or vice versa.

The mounting means 21 and 25 include frame attached members of a suitable structure such as straps 27 which are bolted or otherwise suitably attached at their upper ends to the frame 19 as indicated by the bolts 29. The lower end of each strap 27 carries a laterally extending post 31 which supports a resilient jaw or pipe clamp member 33, the structure of which is shown best in FIGS. 2 and 3. The mounting means 23 has an attachment member 35 in the form of a right angle strap that has a top flange 37 which is bolted or otherwise suitably attached at 39 to the chassis 19. At its bottom end, the member 35 carries a rubber sleeve 41 that is secured by a bolt 43 threaded into the attachment member to form a post for supporting a resilient jaw or clamp member 45, the details of which are shown best in FIGS. 4 and 5.

As will be apparent hereinafter, the clamps 33 and 45 provide some resiliency and shock absorbing capacity to accommodate some relative movement between the conduit 13 and the frame 19. Additional flexibility in the mounting means, if desired, may be provided in any suitable way, various devices being known and used in the art. For example, the hanger strap could be made flexible as illustrated by the braided or elastic section 47 of the strap 27. Preferably, however, the strap is solid and rather compression resistant, as illustrated by metal strap 35, to facilitate the snap-in of the conduit into the resilient jaws. Actually, the resilient clamps 33 and 45 are of such design that they can be readily secured with only minor hanger modifications to a wide variety of designs of hangers now in use with automotive exhaust systems.

As seen best in FIGS. 2 and 3, the resilient clamp 33 comprises a single piece of spring wire that is bent to the special configuration of FIG. 2. It is apparent that the member 33 could also be formed of spring steel strap stock. The two ends of the clamp 33 are formed as substantially closed loops 49 which are spaced apart across the bottom of the member 33 to define a mouth through which the pipe 3 may be inserted and removed. Extending from the loops 49 are possible jaw sections 51 and 53 which have a configuration to suit that of the pipe being supported (circular in the usual case and in the drawings). The jaws are laterally or diametrically resilient so that insertion of the pipe 13 through the mouth of the clamp functions to cam the jaws apart to permit complete entry. The ends of the jaw sections criscross at 55 as the central section of the clamp is bent to form a holding section 57 of suitable shape, preferably a circular loop as illustrated, to fit on the post 31. The point 55 is, in effect, the pivot point for the jaws 51 and 53.

In the relaxed condition of the spring member 33, the interior size of the loop 57 will be somewhat larger and that of the jaws 51 and 53 somewhat smaller than shown in FIG. 2 for the assembled condition. This will enable the loop 57 to readily slide over the post 31. The post may be provided with an enlarged diameter outer portion 59 to serve as a shoulder means to prevent the loop 57 from sliding off. The relaxed size of the two jaws is, of course, smaller than the outer diameter of the pipe 13 so that after insertion of the pipe the jaws resiliently grip it as the expand. It will be appreciated that the jaws will snap in place around the pipe as it goes home in them after having spread them apart by passage between the two loops 49. The jaws have a substantial portion of their lengths extending underneath the lower half of the pipe to provide a holding and retaining means hat furnishes upward pressure to hold the pipe securely in place. Expansion of the jaw sections reduces the size of the loop 57 so that it resiliently grips the post 31. The resiliency of the various parts of the clamp 33 enables the clamp to absorb vibration and small relative movement of the pipe with respect to the post 31 or hanger 27. If the hanger 27 is flexible, as illustrated, it can absorb larger relative movement between the pipe and the frame 19.

The clamp 45 of FIGS. 4 and 5 incorporates the principles of clamp 33 in a modified structural form. Thus the clamp 45 is formed of a single piece of spring wire and the opposite ends 61 are squared and separated to provide a tapered inlet opening or mouth that is enlarged by the upper surface of the pipe upon insertion. The jaw sections 63 and 65 extend upwardly from the end portions 61 and are similar to the jaw sections of the clamp 33. The upper ends of the jaw sections 63 and 65, however, blend into a holding section comprising two loops 67 and 69 that fit over the post 41. The double loop structure causes the jaws 63 and 65 to be axially separated by one wire thickness as can be seen in FIG. 5. Preferably, the ends 61 of the jaws 63 and 65 are provided with barbs or teeth 71 on their inner edges which, as seen in FIG. 4, function as ratchets to provide retaining action supplementing that provided by the bottom sections of the resilient jaws 63 and 65. In the arrangement of FIGS. 4 and 5, the added loop in the holding section together with the rubber sleeve 41 provide additional vibration and shock absorbing capacity as compared with the structure of FIGS. 2 and 3 so that it may be even more feasible to make the hanger strap 35 of a solid and substantial non-flexible connection with the frame 19.

In use, it is contemplated that the mounting means 21, 23, and 25 will be attached to the frame 19 at the desired positions as determined by the design structure of the automobile or other vehicle or installation. The preassembled complete exhaust system 5 may then be placed adjacent the frame 19 and the worker has his choice of snapping it in place on the mountings as a first stage, or of bolting the exhaust pipe 7 to the exhaust manifold 9 as the first stage. In either case, the pipe 13 can be readily pushed through the resilient jaws of the clamps 33 and/or 45 and snapped in place on the frame 19.

When it becomes necessary to remove the conduit 13 and replace it with a new one during the operating life of the engine 1, the jaws of the clamps 33 and 35 can be readily pried apart with a suitable wedge type tool (or pulled apart via loops 49) so that the pipe 13 can be removed. The clamps 33 an/or 45 can then be re-used with the replacement pipe 13 thereby providing an added advantage over the conventional U-bolt and bracket assemnlies which, because of rusting, must often be destroyed in order to remove the pipe 13.

FIGS. 6 – 9 illustrate a mounting or hanger means 101 which comprises a bracket or strap member 103 and a spring wire clamp member 105. The strap 103 has a main section 107 which is solid metal and has a plurality (not shown) of openings 109 along its length to provide a plurality of points at which it can be attached by a bolt to the frame 19 or other support. The bottom of the strap section 107 is offset as seen at 111 to cooperate with a second strap section 113 which is offset in the opposite direction as seen at 115. The upper end of section 113 is reduced in width and offset to provide a tongue 117 that extends through a slot 119 in the section 107 so that section 113 fits flat against and is supported in position by opposite sides of section 107. In the supported position the offset portions 111 and 115 have aligned holes 121 through which a rivet or post 123 extends. An annular rubber grommet 125 fits on the rivet 123 and is clamped between the two portions 111 and 115 by the rivet heads 127 that bear against the outside faces of the portions 111 and 115. The various parts are sized and shaped to provide a sturdy, solid assembly at the bottom of the strap member 103 which transmits vertical loads on the grommet 125 and post 123 into the upper portion of strap section 107 via the two offset portions 111 and 115.

The clamp member 105 comprises a single piece of spring wire that has two spaced ends 131 and 133. The central section of the wire is in the form of two helical loops 135 that fit on the grommet 125 as seen best in FIG. 7 to form a holding section for the clamp. The end sections of the wire extending between the loops and the ends 131 and 133 criss cross at 137 (FIGS. 6 and 8) and are shaped to provide jaw sections 139 and 141. In front elevation the clamp has a FIG. 8 shape which is open on the bottom between ends 131 and 133 in a tube receiving mouth 143. As seen in FIG. 6, the jaw sections 139 and 141 have an elliptical shape to enable them to fit and grip a maximum number of pipe sizes without rattling. As seen at 145 in FIG. 7, the jaw sections criss cross each other, i.e., are oppositely offset, in the direction of the length of the rivet 123 and the axis of a pipe held between the jaws. This offset serves as a means to prevent twisting of the clamp off of a pipe.

As seen in FIGS. 6 and 9, the ends 131 and 133 are shaped to have barbs 147 at their inner sides which act as ratchet teeth to prevent camming out of a pipe. The end faces of the wire form a taper and the corners are rounded at 149, in contrast to the square corners in FIG. 4, to provide a chamfered, tapered, funnel mouth effect that makes it as easy as possible for a pipe 151 to expand the jaws so that it can pass through the mouth 143.

When the jaw sections 139 and 141 are spread apart as seen in FIG. 8, they contact a pipe at the barbs and at points of tangency, due to their elliptical shape, thereby minimizing heat transference. Spreading of the jaws tends to raise criss cross point 137 and reduce the diameter of spring coils 135 so that they are tightly compressed on rubber grommet 125. The energy stored in the coils holds the barbs 147 in place, i.e., resists expansion of mouth 143, so that a down load on the pipe tends to straighten the jaws 139 and 141 and their resistance to this also holds the pipe inside the clamp. As already indicated, the elliptical shape of the jaws enables the foregoing action to take place with a rather wide range of pipe sizes.

FIGS. 10 – 12 illustrate another form of snap-in hanger means 201 which permits angular movement of the clamp with respect to the strap. It comprises a hanger bracket or strap 203, a spring clamp 205, and a connector piece 207 between the strap and clamp. The strap or bracket is preferably stiff metal that contains a series of vertically spearated bolt holes 209 to enable it to be attached to the frame 19 or the like at various points along its length. The clamp 205 is formed of spring steel strip 211 bent to the symmetrical quadrilateral shape of FIG. 10 that is open on the bottom to form a mouth 213. The end edges 215 of the strip are turned in on a radius 217 to provide barbs or ratchet teeth to engage the pipe 219 (FIG. 11) and a tapered or chamfered funnel effect for the mouth 213 to ease entry of the pipe 219.

The clamp 205 has an upper base section 221 and upper arms 223 diverging downwardly away from the base. Lower converging arms 225, terminating in ends 215, are connected to the upper arms at elbow bends 227. The upper base 221 has a through aperture whereby it is received on and pivotally supported by a rivet or post 229 on the bottom section 231 of the connector 207. The connector is preferably a bulged U-shape and preferably is a reversely bent strip of rubber tire carcass or the equivalent so that it possesses resilience, durability, and thermal an shock insulating properties. The upper ends of the legs 233 of the connector are pivotally attached to the bottom of the strap 203 by a rivet 235. It will be seen that the rivet 235 will permit some rotation or angular relative movement of the connector (and clamp) with respect to the strap 203 about a horizontal axis. Similarly, the rivet 229 will permit swivelling or relative rotary and angular movement of the clamp around a vertical axis.

In use, the clamp jaws formed by the upper and lower arms are spread apart to open mouth 213 and permit insertion of pipe 219. In some entries the connector 207 furnishes enough vertical stiffness to permit clamping and in others the rivet 235 may react directly against the bottom of the strap 203. The connector 207 is preferably stiff enough to carry ordinary vertical pipe loads and prevent substantial horizontal sway while remaining substantially in the bulged shape of FIG. 11. The bulge permits overloads in any direction to be readily absorbed by the connector 207.

Modifications in the specific structure illustrated may be made without departing from the spirit and scope of the invention. It is also apparent that the exhaust system can be vertically disposed as in some truck or bus installations, and that the hanger means may be used for installations and applications other exhaust systems.

I claim:

1. In an exhaust system for motor vehicles having a frame and an internal combustion engine discharging exhaust gases into the system, said system including a silencing member and at least one exhaust gas conducting conduit connected to the silencing member, mounting means each comprising a single vertically extending hanger strap for supporting the system on the engine and frame at a plurality of points spaced apart lengthwise of the system, said mounting means each including a vertically extending post element and at least one conduit snap-in clamp member attached to the post element and simultaneously engaging top and bottom parts of the conduit and having a pair of laterally resilient jaws shaped to fit around at least a major portion of the periphery of said conduit and resiliently hold the conduit in the clamp member between the jaws, said jaws having ends spaced apart by less than the width of the conduit to define an expandable resilient mouth for snap-in insertion and removal of the conduit, said clamp member being formed of a single piece spring metal strip so that the jaws are inherently resilient, said strip beng shaped to have two pais of substantially straight sides and a holding side between each pair of sides, said holding side being substantially horizontal and fitting on said post element and said pairs of sides extending from said holding section and being substantially V-shaped to form said jaws and a connector securing said post to opposite sides of said strap.

2. The invention as set forth in claim 1 wherein said connector comprises a resilient U-shaped connector forming a part of said mounting means, said U-shaped connector having top ends and said post being secured to the base of the U, said top ends bein secured to opposie sides of said strap.

3. The invention as set forth in claim 2 wherein said connector is formed of an insulating non-metallic material.

4. The invention as set forth in claim 3 wherein said connector is formed of rubber tire carcass and has a bulge between the top ends and the base of the U to provide for a deformation of the U-shape and flattening of the top ends to less than the bight of the U.

5. The invention as set forth in claim 1 wherein said post provides a swivel connection for the clamp member with respect to the hanger strap.

6. In an exhaust system for motor vehicles having a frame and an internal combustion engine discharging exhaust gases into the system, said system including an exhaust gas conducting connected to the engine, mounting means including a single hanger strap supporting the system on the frame, said mounting means including a snap-in conduit clamp member supported on the hanger strap and formed of a single piece of spring metal strip and simultaneously engaging both top and bottom parts of the conduit, said clamp member being formed to have a pair of converging substantially straight laterally resilient jaws to fit around and engage the bottom periphery of said conduit and resiliently hold the conduit between the jaws, said metal strip being formed to have a pair of converging substantially straight sides extending upwardly and inwardly from the tops of said jaws and engaging the upper periphery of the conduit, said jaws having ends spaced apart by less than the width of the conduit to define an expandable resilient mouth for insertion and removal of the conduit, said clamp member having a substantially straight horizontal holding section located opposite said mouth and extending between the top ends of said straight sides, and swivel means secured to the holding section for supporting the clamp member on the hanger.

7. In a system as set forth in claim 6, said swivel means including a resilient insulating connector and a vertical post providing a swivel connection securing the holding section to the connector.

* * * * *

UNITED STATES PATENT OFFICE
CERTIFICATE OF CORRECTION

Patent No. 3,960,232            Dated June 1, 1976

Inventor(s) FRANKLIN R. HUBBELL, III

It is certified that error appears in the above-identified patent and that said Letters Patent are hereby corrected as shown below:

Column 1, line 34, "hen" should be --then--. Column 3, line 10, "3" should be --13--; line 33 "the expand" should be --they expand--; line 39, "hat" should be --that--. Column 6, line 43, "bein" should be --being--; line 44, "opposie" should be --opposite--; line 59, after "conducting" insert --conduit--.

Signed and Sealed this

Third Day of May 1977

[SEAL]

Attest:

RUTH C. MASON
*Attesting Officer*

C. MARSHALL DANN
*Commissioner of Patents and Trademarks*